United States Patent
Armangau et al.

(10) Patent No.: US 9,880,743 B1
(45) Date of Patent: Jan. 30, 2018

(54) TRACKING COMPRESSED FRAGMENTS FOR EFFICIENT FREE SPACE MANAGEMENT

(71) Applicant: EMC Corporation, Hopkinton, MA (US)

(72) Inventors: Philippe Armangau, Acton, MA (US); Jean-Pierre Bono, Westborough, MA (US); Ahsan Rashid, Edison, NJ (US); Rohit Chawla, Scotch Plains, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 15/086,636

(22) Filed: Mar. 31, 2016

(51) Int. Cl.
*G06F 12/00* (2006.01)
*G06F 13/00* (2006.01)
(Continued)

(52) U.S. Cl.
CPC .......... *G06F 3/0608* (2013.01); *G06F 3/0631* (2013.01); *G06F 3/0644* (2013.01); *G06F 3/0685* (2013.01)

(58) Field of Classification Search
CPC . G06F 3/00; G06F 3/06; G06F 3/0601; G06F 3/0608; G06F 3/0628; G06F 3/0629; G06F 3/0631; G06F 3/0638; G06F 3/064; G06F 3/0641; G06F 3/0643; G06F 3/0644; G06F 3/0646; G06F 3/0647; G06F 3/0649; G06F 3/065; G06F 3/0652; G06F 3/0653; G06F 3/0655; G06F 3/0656; G06F 3/0658; G06F 3/0659; G06F 3/0661; G06F 3/0662; G06F 3/0664; G06F 3/0665; G06F 3/0667; G06F 3/0668; G06F 3/0671; G06F 3/0673; G06F 3/0674; G06F 3/0676; G06F 3/0677; G06F 3/0679; G06F 3/068; G06F 3/0683; G06F 3/0685; G06F 3/0686; G06F 3/0688; G06F 3/0689; G06F 12/00; G06F 12/02; G06F 12/0223; G06F 12/023; G06F 12/0238; G06F 12/0246; G06F 12/0253;
(Continued)

(56) References Cited

U.S. PATENT DOCUMENTS 5,394,534 A * 2/1995 Kulakowski .......... G06F 3/0601 711/112
5,701,516 A 12/1997 Cheng et al.
(Continued)

OTHER PUBLICATIONS

FreeLoader: Scavenging Desktop Storage Resources for Scientific Data; Vazhkudai et al; Proceedings of the 2005 ACM/IEEE Conference on Supercomputing; Nov. 12-18, 2005 (11 pages).*
(Continued)

*Primary Examiner* — Daniel C Chappell
(74) *Attorney, Agent, or Firm* — BainwoodHuang

(57) ABSTRACT

A technique for managing storage space in a file system applies reference weights to compressed storage extents stored in multi-block segments. Each time a reference weight for a compressed storage extent in a segment changes to a value that indicates that the storage extent is no longer in use, a file system manager increments a freed-fragment counter provided for a range of the file system that includes the segment. The file system manager then determines whether to scavenge for free space in that range of the file system based at least in part on a count of the free-fragment counter.

19 Claims, 5 Drawing Sheets

(51) Int. Cl.
*G06F 13/28* (2006.01)
*G06F 3/06* (2006.01)

(58) Field of Classification Search
CPC ............ G06F 12/0261; G06F 12/0269; G06F 12/0276; G06F 2003/0691; G06F 2003/0692; G06F 2003/0694; G06F 2003/0695; G06F 2003/0697; G06F 2003/0698; G06F 2211/00–2211/902; G06F 2212/00–2212/7211; H03M 7/30–7/707
See application file for complete search history.

(56) References Cited

U.S. PATENT DOCUMENTS

| | | | | |
|---|---|---|---|---|
| 5,802,599 | A * | 9/1998 | Cabrera | G06F 3/0611 711/100 |
| 6,256,705 | B1 * | 7/2001 | Li | G06F 3/0608 711/112 |
| 6,453,383 | B1 * | 9/2002 | Stoddard | G06F 3/0607 707/999.202 |
| 7,058,788 | B2 * | 6/2006 | Niles | G06F 3/0608 711/202 |
| 7,171,532 | B2 * | 1/2007 | Kodama | G06F 3/0626 709/203 |
| 7,392,291 | B2 * | 6/2008 | Jewett | G06F 3/0626 709/214 |
| 7,739,312 | B2 * | 6/2010 | Gordon | G06F 3/0608 707/802 |
| 8,156,306 | B1 * | 4/2012 | Raizen | G06F 3/0608 707/813 |
| 8,190,850 | B1 | 5/2012 | Davenport et al. | |
| 8,600,949 | B2 * | 12/2013 | Periyagaram | G06F 3/0608 707/664 |
| 8,756,396 | B1 * | 6/2014 | Pruthi | G06F 12/0646 707/809 |
| 8,782,324 | B1 * | 7/2014 | Chen | G06F 12/0238 711/102 |
| 8,880,788 | B1 * | 11/2014 | Sundaram | G06F 3/0688 711/103 |
| 9,086,820 | B2 * | 7/2015 | Gold | G06F 3/0608 |
| 9,489,296 | B1 * | 11/2016 | Tomlin | G06F 12/0253 |
| 9,665,302 | B1 * | 5/2017 | Huff | G06F 3/064 |
| 9,665,303 | B1 * | 5/2017 | Huff | G06F 3/064 |
| 9,671,960 | B2 * | 6/2017 | Patel | G06F 3/0608 |
| 2001/0037336 | A1 * | 11/2001 | Sauntry | G06F 12/023 |
| 2003/0191783 | A1 * | 10/2003 | Wolczko | G06F 12/0261 |
| 2004/0158589 | A1 * | 8/2004 | Liang | G06F 12/0253 |
| 2005/0060509 | A1 * | 3/2005 | Loafman | G06F 12/023 711/170 |
| 2005/0065973 | A1 * | 3/2005 | Steensgaard | G06F 12/0253 |
| 2006/0272027 | A1 * | 11/2006 | Noble | G06F 12/1408 726/27 |
| 2007/0198617 | A1 * | 8/2007 | Joisha | G06F 12/0261 |
| 2008/0098192 | A1 * | 4/2008 | Im | G06F 12/0246 711/170 |
| 2008/0282045 | A1 * | 11/2008 | Biswas | G06F 12/0246 711/159 |
| 2009/0132622 | A1 * | 5/2009 | Rossmann | G06F 12/0261 |
| 2010/0332846 | A1 * | 12/2010 | Bowden | G06F 17/30097 713/189 |
| 2011/0093664 | A1 * | 4/2011 | Leppard | G06F 3/061 711/154 |
| 2011/0219205 | A1 * | 9/2011 | Wright | G06F 15/173 711/206 |
| 2011/0289260 | A1 * | 11/2011 | Wang | G06F 12/0246 711/103 |
| 2012/0078982 | A1 * | 3/2012 | Massarenti | G06F 12/0276 707/813 |
| 2012/0124106 | A1 * | 5/2012 | Allen | G06F 12/0276 707/814 |
| 2013/0054545 | A1 * | 2/2013 | Anglin | G06F 17/3015 707/693 |
| 2013/0173875 | A1 * | 7/2013 | Kim | G06F 12/0246 711/160 |
| 2014/0032817 | A1 * | 1/2014 | Bux | G06F 12/0246 711/103 |
| 2014/0173268 | A1 * | 6/2014 | Hashimoto | G06F 11/0754 713/2 |
| 2014/0195725 | A1 * | 7/2014 | Bennett | G06F 12/0246 711/103 |
| 2014/0201491 | A1 * | 7/2014 | Luan | G06F 12/023 711/173 |
| 2014/0204672 | A1 * | 7/2014 | Lee | G11C 16/16 365/185.12 |
| 2014/0372673 | A1 * | 12/2014 | Higeta | G06F 12/0246 711/103 |
| 2015/0220282 | A1 * | 8/2015 | Tsuda | G06F 13/1668 711/114 |
| 2015/0221370 | A1 * | 8/2015 | Kim | G11C 29/52 711/103 |
| 2015/0301964 | A1 * | 10/2015 | Brinicombe | G06F 13/28 710/308 |
| 2016/0179386 | A1 * | 6/2016 | Zhang | G06F 3/064 711/103 |

OTHER PUBLICATIONS

Design of a Scalable, Fault Tolerant, Heterogeneous and Secured Distributed Storage Framework; Louis et al; First International Conference on Emerging Trends in Engineering and Technology; Jul. 16-18, 2008; pp. 1313-1316 (4 pages).*

Yannis Klonatos et al., "Transparent Online Storage Compression at the Block-Level", ACM Transactions on Storage, May 2012, 33 pages, vol. 8, No. 2, Article 5.

* cited by examiner

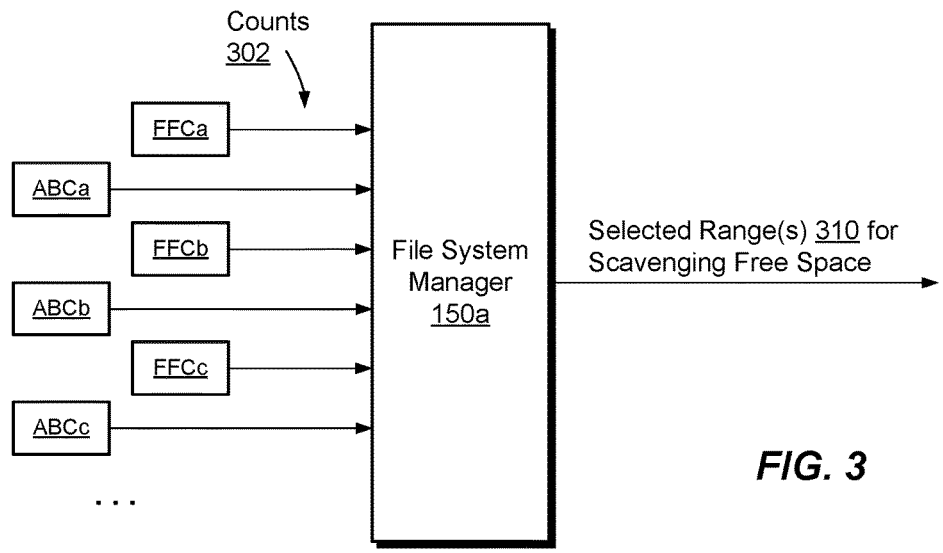
*FIG. 3*
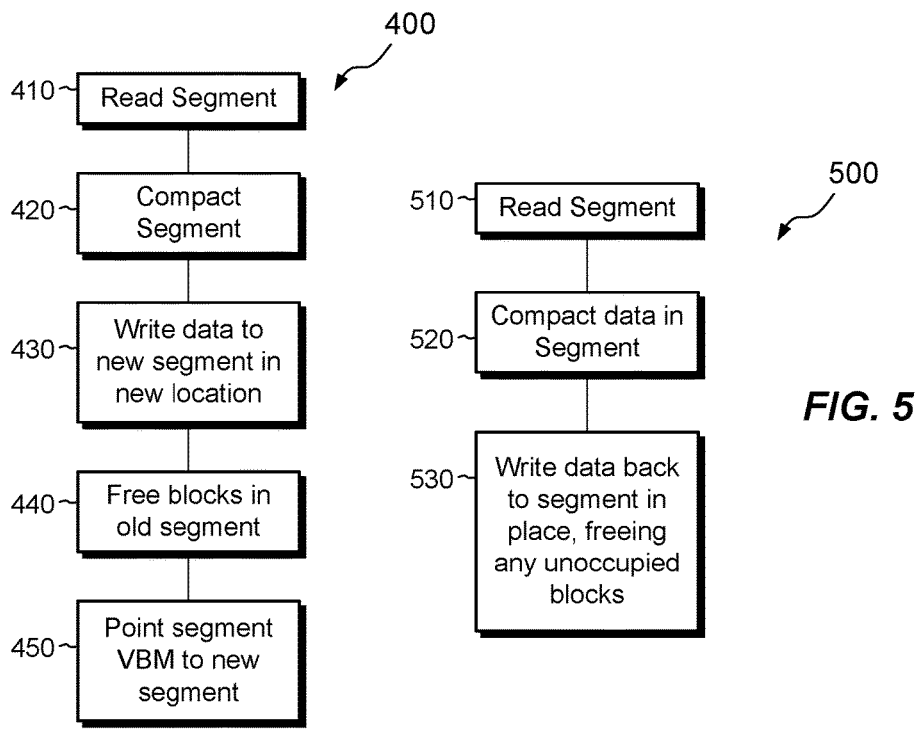
*FIG. 4*
*FIG. 5*

TRACKING COMPRESSED FRAGMENTS FOR EFFICIENT FREE SPACE MANAGEMENT

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly arrange data in file systems, and file systems commonly store data, as well as metadata, in blocks. As is known, a "block" is the smallest unit of storage that a file system can allocate. Blocks for a given file system are generally of fixed size, such as 4 KB, 8 KB, or some other size.

File systems typically categorize blocks as either allocated or free. Allocated blocks are those which are currently in use, whereas free blocks are those which are not. As a file system operates, it tends to allocate new blocks, to accommodate new data, but it also tends to generate new free blocks, as previously allocated blocks become free. The file system may run utilities to coalesce ranges of contiguous free blocks. For example, a utility may move data found in allocated blocks between areas of the file system to create large regions of entirely free blocks. In various examples, the file system may return such regions of free blocks to a storage pool; it may also make such regions available to accommodate new writes of sequential data.

SUMMARY

File systems currently being developed compress data down to sizes smaller than a block and pack such compressed data together in multi-block segments. Unfortunately, schemes for tracking free space based on whether blocks are allocated or free are insufficient for tracking free space in segments. For example, all blocks that make up a segment may be allocated, even though the segment may contain enough free space to encompass one or more blocks. Thus, knowing only whether blocks are allocated or free can greatly underestimate the amount of free space in a file system. Similarly, block allocation status alone gives incomplete information to file system utilities that scavenge free space. To make the best use of limited processing resources, such utilities preferentially target areas with the most free space. Yet, when working on segments containing compressed data, such utilities may fail to properly identify these areas and may thus consume valuable storage system resources inefficiently.

In contrast with the above-described approach for tracking free space, which can underestimate free space when used in file systems that contain compressed data, an improved technique for managing storage space in a file system applies reference weights to compressed storage extents stored in multi-block segments. Each time a reference weight for a compressed storage extent in a segment changes to a value that indicates that the storage extent is no longer in use, a file system manager increments a freed-fragment counter provided for a range of the file system that includes the segment. The file system manager then determines whether to scavenge for free space in that range of the file system based at least in part on a count of the freed-fragment counter.

In some examples, the file system includes multiple ranges, with each range accommodating multiple segments and having its own freed-fragment counter. In such cases, the file system manager receives as input counts from the freed-fragment counters across the multiple ranges and selects a range on which to perform free-space scavenging based at least in part on the received counts.

Advantageously, the improved technique provides more accurate measures of free space in a file system than does the prior technique, and thus better informs file system utilities of ranges in the file system where processing resources can be applied to the greatest benefit in scavenging free space. Efficient scavenging of free space improves file system performance in significant ways. For example, creating areas of entirely free blocks promotes sequential writes to the file system, which can be performed with high efficiency. Also, such techniques help to reduce file system fragmentation, which promotes more efficient disk access. These improvements result not only in better performance of a data storage system running the file system, but also of hosts that access the data storage system, as they are likely to encounter fewer delays in receiving responses to their storage requests. Any users of host applications have commensurately improved experiences.

Certain embodiments are directed to a method of managing storage space in a file system. The method includes storing data in a segment in a file system, the segment composed from multiple contiguous blocks, the data stored in the segment including multiple compressed storage extents having various sizes. The method further includes maintaining, for each storage extent in the segment, a corresponding weight, the weight arranged to indicate whether the respective storage extent is currently part of any file in the file system. In response to performing a file system operation that changes the weight of a storage extent in the segment to a value that indicates that the storage extent is no longer part of any file in the file system, the method still further includes incrementing a freed-fragment counter, the freed-fragment counter providing a count of freed storage extents within a range of the file system, the range including the segment, the count providing input to a file system manager for determining whether to scavenge free space from within that range.

Other embodiments are directed to a data storage system constructed and arranged to perform a method of managing storage space in a file system, such as the method described above. Still other embodiments are directed to a computer program product. The computer program product stores instructions which, when executed on control circuitry of a data storage system, cause the data storage system to perform a method of managing storage space in a file system, such as the method described above. Some embodiments involve activity that is performed at a single location, while other embodiments involve activity that is distributed over a computerized environment (e.g., over a network).

It should be understood that this summary is provided to familiarize the reader with features of disclosed embodiments and is not intended to define the invention hereof or to be limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

FIG. 3 is a flowchart showing inputs to a file system manager, which the file system manager processes to select a range (or ranges) in which to scavenge free space;

FIG. 4 is a flowchart showing one example method for scavenging free space;

FIG. 5 is a flowchart showing another example method for scavenging free space.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing storage space in a file system applies reference weights to compressed storage extents stored in multi-block segments. Each time a reference weight for a compressed storage extent in a segment changes to a value that indicates that the storage extent is no longer in use, a file system manager increments a freed-fragment counter provided for a range of the file system that includes the segment. The file system manager then determines whether to scavenge for free space in that range of the file system based at least in part on a count of the freed-fragment counter.

Figure 1:
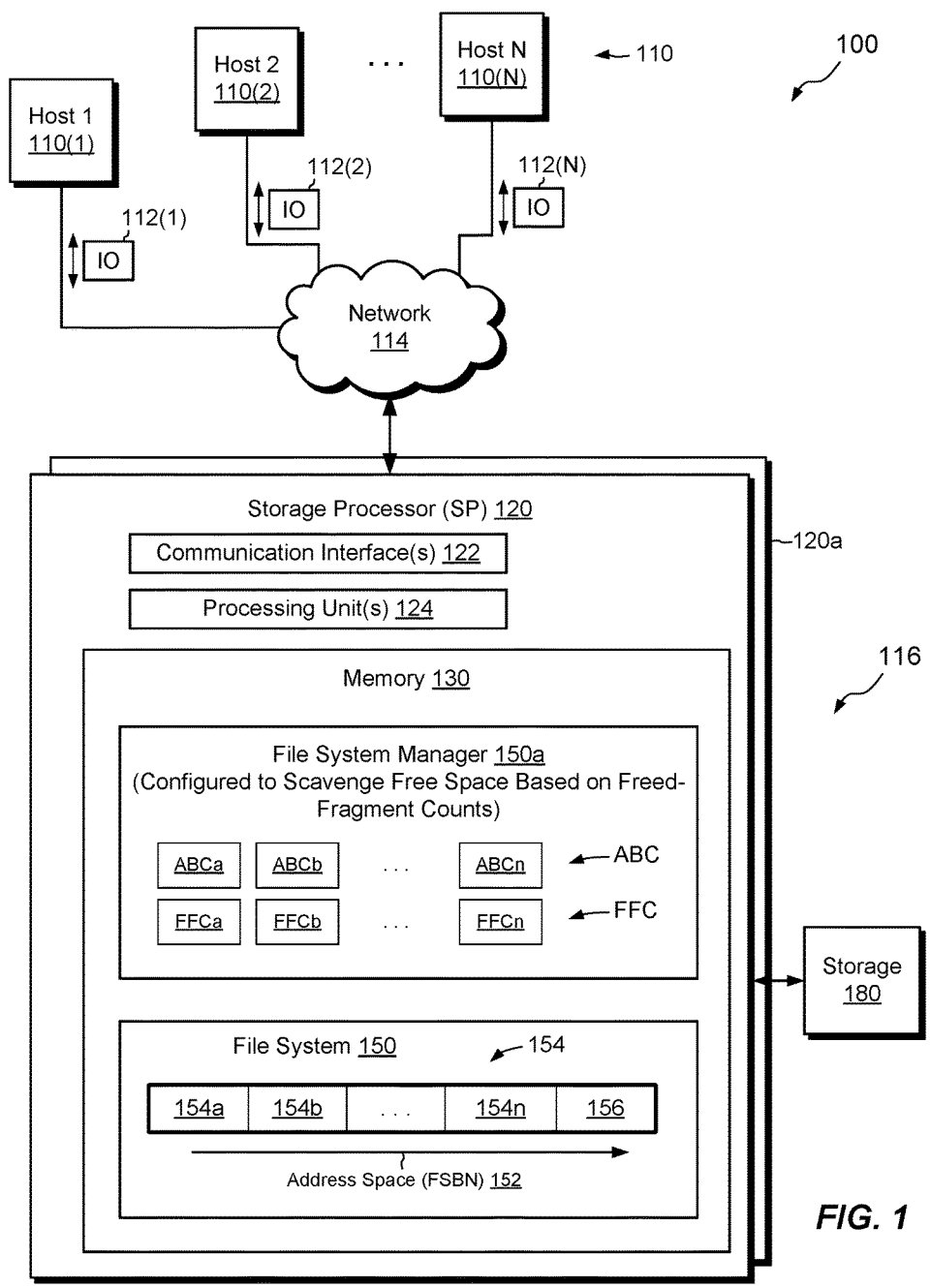
FIG. 1 is a block diagram of an example environment in which improved techniques hereof for managing storage in a file system can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

In an example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes a file system 150 and a file system manager 150a. The file system 150 is implemented as an arrangement of blocks, which are organized in an address space 152. Each of the blocks has a location in the address space 152, identified by FSBN (file system block number). For example, FSBN may range from zero to some large number, with each value of FSBN identifying a respective block location. The file system manager 150a performs various processing on the file system 150, such as allocating blocks, freeing blocks, maintaining counters, and scavenging for free space.

In an example, the address space 152 of the file system 150 is provided in multiple ranges, such as ranges 154a to 154n, where each range 154 is a contiguous range of FSBNs and is configured to store blocks containing file data. In addition, range 156 includes file system metadata, such as inodes, indirect blocks (IBs), and virtual block maps (VBMs), for example. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. Although ranges 154 and 156 are shown for organizing data and metadata, respectively, it should be appreciated that data and metadata may be organized in other ways, or even randomly, within the file system 150. The particular arrangement shown is intended merely to be illustrative.

The file system manager 150*a* includes various counters, which may be provided on a per-range basis. For example, file system manager 150*a* includes allocated block counters ABCa through ABCn, one for each of ranges 154*a* through 154*n* in the file system 150. In some examples, each allocated block counter (ABC) provides a count of allocated blocks within the respective range. Given that each range 154 may have a known size, each allocated block counter ABC also provides, by inference, a count of free blocks in the respective range. In other examples, each allocated block counter ABC explicitly provides a count of free blocks in the respective range. The file system manager 150*a* also includes freed-fragment counters FFCa through FFCn, again one for each of ranges 154*a* through 154*n*. As will be described, the file system 150 stores many multi-block segments that contain compressed storage extents. In an example, each freed-fragment counter FFC provides a count of compressed storage extents that have become free in the respective range 154.

The ranges 154 may be of any size and of any number. In some examples, the file system manager 150*a* organizes ranges 154 in a hierarchy. For instance, each range 154 may include a relatively small number of contiguous blocks, such as 16 or 32 blocks, for example, with such ranges 154 provided as leaves of a tree. Looking up the tree, ranges may be further organized in CG (cylinder groups), slices (units of file system provisioning, which may be 256 MB or 1 GB in size, for example), groups of slices, and the entire file system, for example. Although the ranges 154 as shown apply to the lowest level of the tree, the term "ranges" as used herein may refer to groupings of contiguous blocks at any level. In addition, counters ABC and FFC may be provided at each level of the tree, e.g., with the counter at each level providing an aggregated value of the counts from the levels below.

In example operation, the hosts 110(1-N) issue IO requests 112(1-N) to the data storage system 116. The SP 120 receives the IO requests 112(1-N) at the communication interfaces 122 and initiates further processing. Such processing may include, for example, performing read and write operations on the file system 150, creating new files in the file system 150, deleting files, and the like. Over time, the file system 150 changes, with new data blocks being allocated and allocated data blocks being freed. As data blocks within a range 154 are allocated, the allocated block counter (ABC) for that range 154 is incremented, e.g., one count for each allocated block. Likewise, as data blocks within a range 154 are freed, the allocated block counter (ABC) for that range 154 is decremented, e.g., one count for each freed block.

In addition, the file system 150 also tracks freed storage extents. In an example, storage extents are versions of block-denominated data, which are compressed down to sub-block sizes and packed together in multi-block segments, such that a block-based scheme for tracking free space cannot be used. In accordance with improvements hereof, the file system manager 150*a* tracks freed storage extents using freed-fragment counters FFC. The FFCs count, for each range 154, a respective count of freed storage extents within the respective range. For example, each time a file system operation causes a storage extent in a range 154 to be freed, e.g., in response to a punch-hole or write-split operation, the file system manager 150*a* increments the respective FFC for that range 154 to reflect the newly freed fragment. In some examples, a count of the FFC for a range 154 continues to grow incrementally until the file system manager 150*a* performs a free-space scavenging operation on that range 154, whereupon the file system manager may reset the FFC for the newly scavenged range to zero.

In accordance with further improvements hereof, the file system manager 150*a* applies FFC counts in determining whether to perform free-space scavenging operations. For example, the file system manager 150*a* determines whether a particular range 154 is a good candidate for free-space scavenging based at least in part on the FFC count for that range 154. A range 154 may qualify as a good candidate, for example, if it has a high FFC count. The operations may further include selecting ranges 154 on which to perform free-space scavenging operations, again based at least on in part on counts of FFCs, with preference going to ranges 154 having higher FFC counts. In some examples, the file system manager 150*a* uses FFCs together with ABCs in determining whether to perform free-space scavenging and/or in selecting ranges on which to perform such scavenging. For example, a range may have a relatively large number of freed fragments but may still be a poor candidate for free-space scavenging if it has a relatively small number of allocated blocks. Thus, the file system manager 150*a* may consider both ABC and FFC together in selecting ranges to scavenge, with FFC being considered primarily in cases in which ABC counts of different ranges are close together, such that FFC may be used as a tiebreaker.

With one or more candidate ranges identified, the file system manager 150*a* may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool.

Figure 2A:
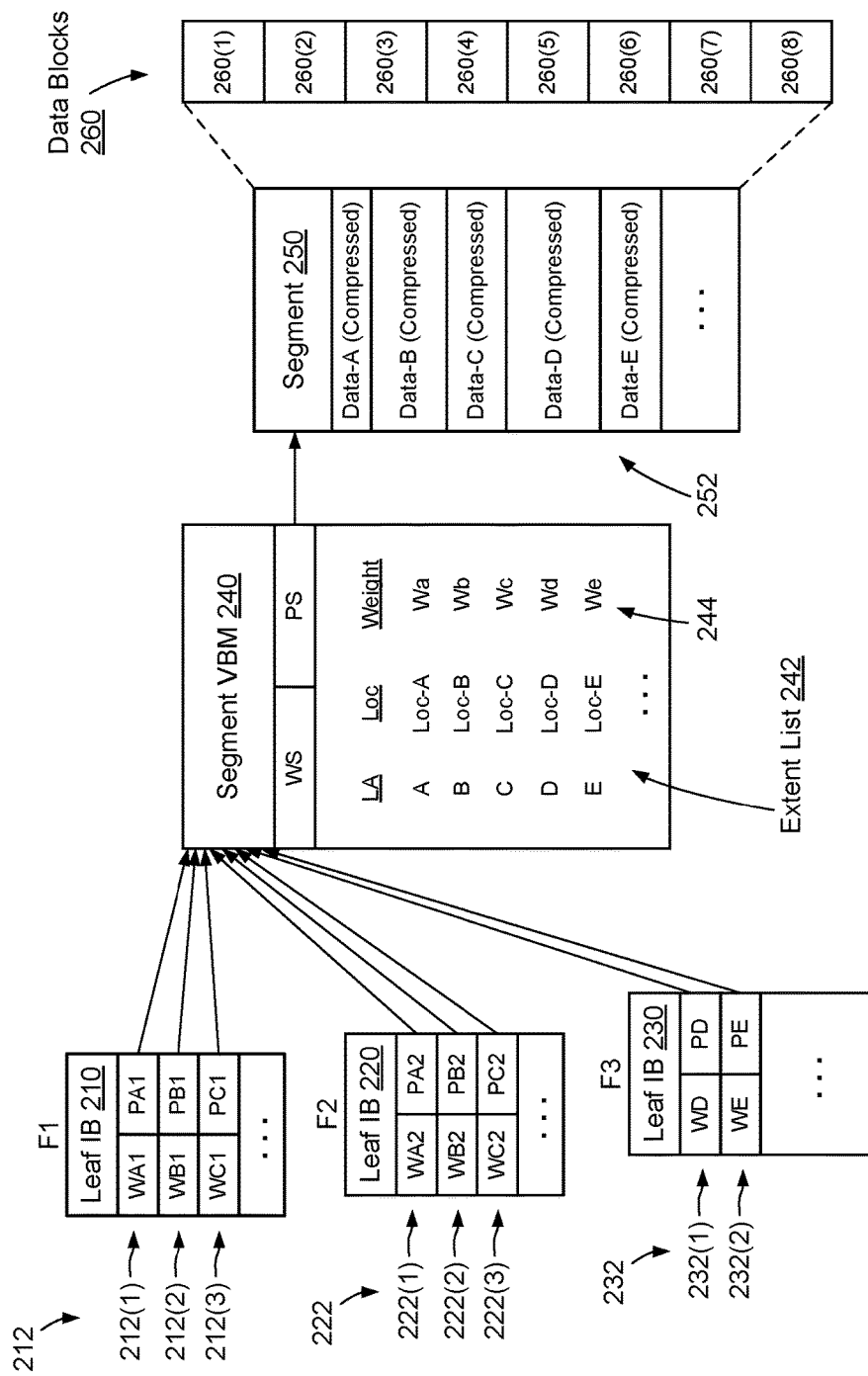
FIGS. 2A and 2B are block diagrams of example data and metadata structures involved in managing storage space in the environment of FIG. 1.
Figure 2B:
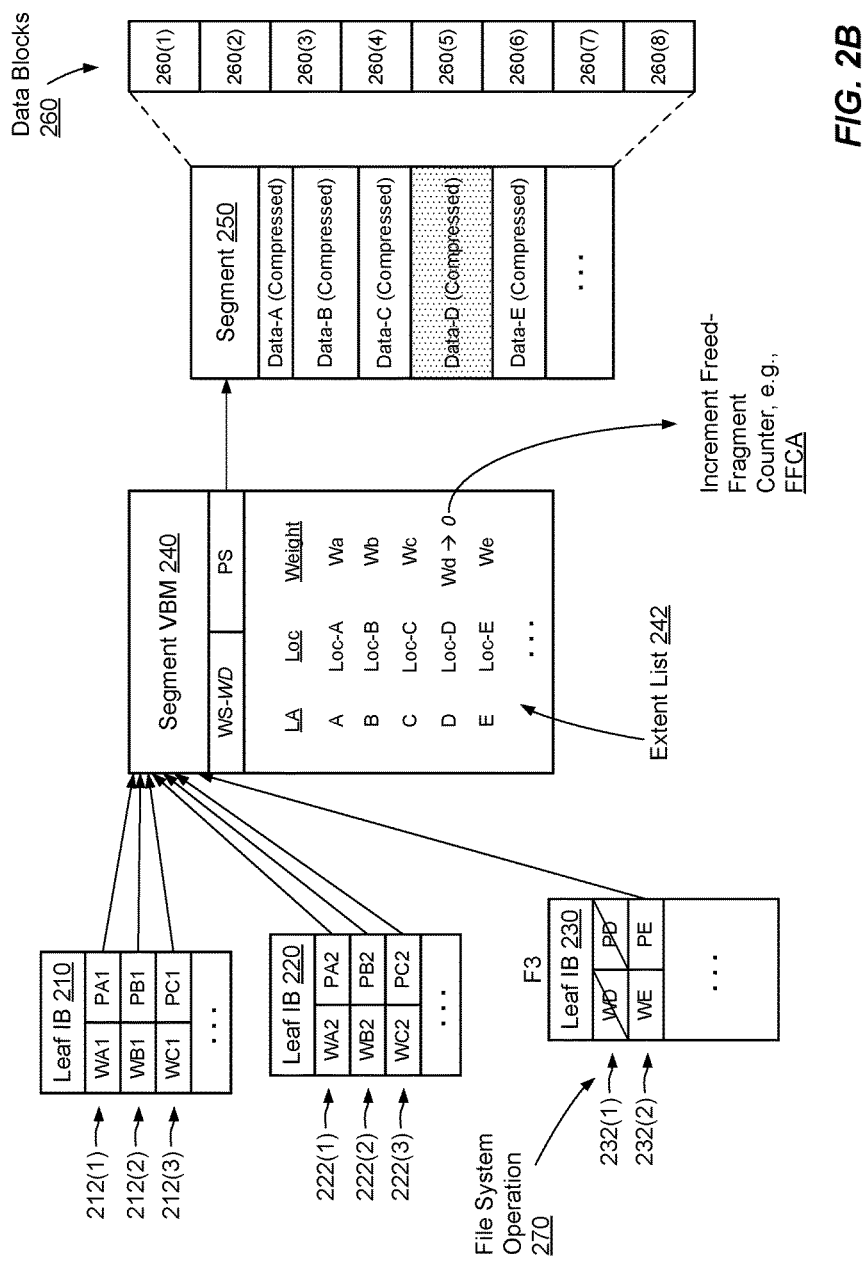

FIGS. 2A and 2B show example file system structures that participate in tracking freed storage extents. As shown in FIG. 2A, a segment 250 is composed from multiple data blocks 260. Here, segment 250 is made up of eight data blocks 260(1) through 260(8); however, the number of data blocks per segment may vary. In an example, the data blocks 260 are contiguous, meaning that they have consecutive FSBNs in the file system address space 152. Although segment 250 is composed from individual data blocks 160, the file system 150 treats the segment 250 as one continuous space. Compressed storage extents 252, i.e., Data-A through Data-E, etc., are packed inside the segment 250, e.g., one immediately after another, without regard to block boundaries. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes.

The segment 250 has an address (e.g., FSBN) in the file system 150, and a segment VBM (Virtual Block Map) 240 points to that address. For example, segment VBM 240 stores a segment pointer PS, which stores the FSBN of the segment 250. By convention, the FSBN of segment 250 may be the FSBN of its first data block, i.e., block 260(1). Although not shown, block 260(1) may have per-block metadata (BMD), which acts as representative metadata for the entire segment 250, and which includes a backward pointer to the segment VBM 240.

As further shown in FIG. 2A, the segment VBM 240 stores an extent list 242. The extent list 242 acts as an index into the segment 250, by associating each compressed storage extent 252, identified by logical address (e.g., LA values A through E, etc.), with a corresponding location within the segment 250 (e.g., Loc values Loc-A through Loc-E, etc., which indicate physical offsets) and a corresponding weight 244 (e.g., Weight values Wa through We, etc.). The weights 244 provide indications of whether the associated storage extents are currently in use by any files in the file system. For example, a positive number for a weight may indicate that at least one file in the file system 150 references the associated storage extent 252. Conversely, a weight of zero may mean that no file in the file system 150 currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight 244 for a storage extent 252 reflects a sum, or "total distributed weight," of the weights of all block pointers in the file system that point to the associated storage extent. In addition, the segment VBM 240 may include an overall weight WS, which reflects a sum of all weights of all block pointers in the file system 150 that point to extents tracked by the segment VBM 240. Thus, in general, the value of WS should be equal to the sum of all weights 244 in the extent list 242.

Various block pointers 212, 222, and 232 are shown to the left. In an example, each block pointer is disposed within a leaf IB (Indirect Block), which performs mapping of logical addresses for a respective file. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D and pointer value PE points to Data-E. File F3 does not appear to have a snapshot relationship with either of files F1 or F2. If one assumes that data block sharing for the storage extents 252 is limited to that shown, then, in an example, the following relationships may hold:

$Wa = WA1 + WA2;$ $Wb = WB1 + WB2;$ $Wc = WC1 + WC2;$ $Wd = WD;$ $We = WE;$ and $WS = \Sigma Wi$ (for $i$=a through e, plus any additional extents 252 tracked by extent list 242).

FIG. 2B shows the same arrangement as FIG. 2A, except that, here, a file system operation 270 is being performed to file F3 at block pointer 232(1). For example, the file system manager 150a may be performing a punch-hole operation or a write split.

As is known, a punch-hole operation is a host-directed command for zeroing out a particular storage location. For instance, a host 110 may issue a SCSI "WRITE-SAME" operation, which SP 120 translates into a write of zeros to the logical address indicated by block pointer 232(1). This operation releases any weight that block pointer 232(1) holds on the extent for Data-D. Thus, in response to this operation 270, the file system manager 150a subtracts the weight WD of block pointer 232(1) from the weight Wd in the extent list 242. But as block pointer 232(1) is the only block pointer in the file system pointing to Data-D, subtracting WD from Wd causes Wd to go to zero. The file system manager 150a detects this transition to zero, and in response to this transition, increments the free-fragment counter FFCA for the range 154 in which the segment 250 is found. Data-D thus becomes a freed fragment (see shading), and the space that it occupies becomes available to be reclaimed by subsequent scavenging operations.

As also known, a write-split is an operation for which an overwrite is requested on data stored in one or more shared data blocks. Rather than overwriting the shared blocks, which disrupt other files sharing the blocks, the file system allocates new blocks and writes the new data to the newly allocated blocks, breaking the previous sharing relationship. Here, if file system operation 270 is a write split, then file system manager 150a may respond by allocating a new segment in the file system 150. The file system manager 150a may copy the shared data (here, Data-D, which is shared with Data-A through Data-C and Data-E) to the newly allocated segment, where it may be packed with other compressed data. The file system manager 150a may further redirect the pointer value PD in block pointer 232(1) to the location of the new segment and assign WD to a new value. Before discarding the old value of WD, the file system manager 150a subtracts that value of WD from Wd, in the same manner described above, which results in Wd transitioning to zero. As before, this transition triggers the file system manager 150a to increment the freed-fragment counter (FFC) for the range 154 that contains segment 250. Once again, the extent for Data-D becomes a freed fragment, which is available to be reclaimed later.

It should be appreciated that the metadata structures shown in FIGS. 2A and 2B may be provided as persistent structures in the range 156 of the file system 150, which may be read into memory but are backed by non-volatile devices in the storage 180.

FIG. 3 shows and example arrangement for selecting ranges on which to perform free-space scavenging in the file system 150. In the example shown, file system manager 150a receives counts 302 from free fragment counters (FFCs) and allocated block counters ABCs for each of ranges 154a-n, or for some subset of those ranges, and processes the counts 302 to generate output indicating selected ranges 310. The file system manager 150a then proceeds to target the selected ranges 310 for scavenging free space, such as by performing garbage collection, space reclamation, and/or free-space coalescing.

FIG. 4 shows an example method 400 for coalescing free space. In an example, the file system manager 150a performs the method 400 on selected ranges of the file system 150 having relatively low allocated block counts and relatively high freed-fragment counts. The process 400 creates contiguous free space in the selected ranges, such as to prepare ranges in the file system 150 to be returned to a storage pool or to receive sequential writes, e.g., in preparation for performing efficient full-stripe writes on underlying storage media.

At 410, the file system manager 150a reads a segment, such as segment 250, into memory. At 420, the file system manager 150a compacts the segment. For example, if the segment includes "holes," i.e., storage extents for which reference weights 244 in the extent list 242 are zero, the file system manager 150a removes the holes to compact the remaining data into a smaller space. At 430, the file system manager 150a writes the data to a newly allocated segment located elsewhere, e.g., in a different range. In some examples, the data written to the new segment may include additional compressed data, such that the new segment may be utilized more fully. In other examples, the new segment may be smaller than the previous one, e.g., made to include a fewer number of data blocks, which is still sufficient to store the compacted data. At 440, blocks that made up the old segment (e.g., blocks 160) are freed. In addition, the file system manager 150a updates the pointer PS in the segment VBM (e.g., 140) to point to the newly allocated segment (450). The activities described in method 400 may be repeated for all segments in a particular range until that range is completely free. At that point, file system manager 150a may reset the freed-fragment counter FFC for that range 154 to zero, may return the data blocks in that range 154 to a storage pool, or may reallocate the blocks, e.g., to support full-stripe writes.

FIG. 5 shows an example method 500 for compacting data in place. The method 500 may be used, for example, in performing garbage collection to gather free space from segments. At 510, the file system manager 150a reads data from a segment, such as segment 150. At 520, the file system manager 150a compacts the data in the segment, i.e., to remove any holes. At 530, the file system manager 150a writes the compacted data back to the same segment. At this time, the file system manager 150a may also update the extent list 242 to reflect any changes in extent locations in the segment 150. Also, the file system manager 150a may then truncate the segment if any block-sized portions are left over after compaction. For example, if data blocks in the file system 150 are 8 KB in size and 18 KB are free at the end of the segment after compaction, then the last two blocks may be removed from the segment and freed. The segment 150 is thus redefined as having a smaller size.

Figure 6:
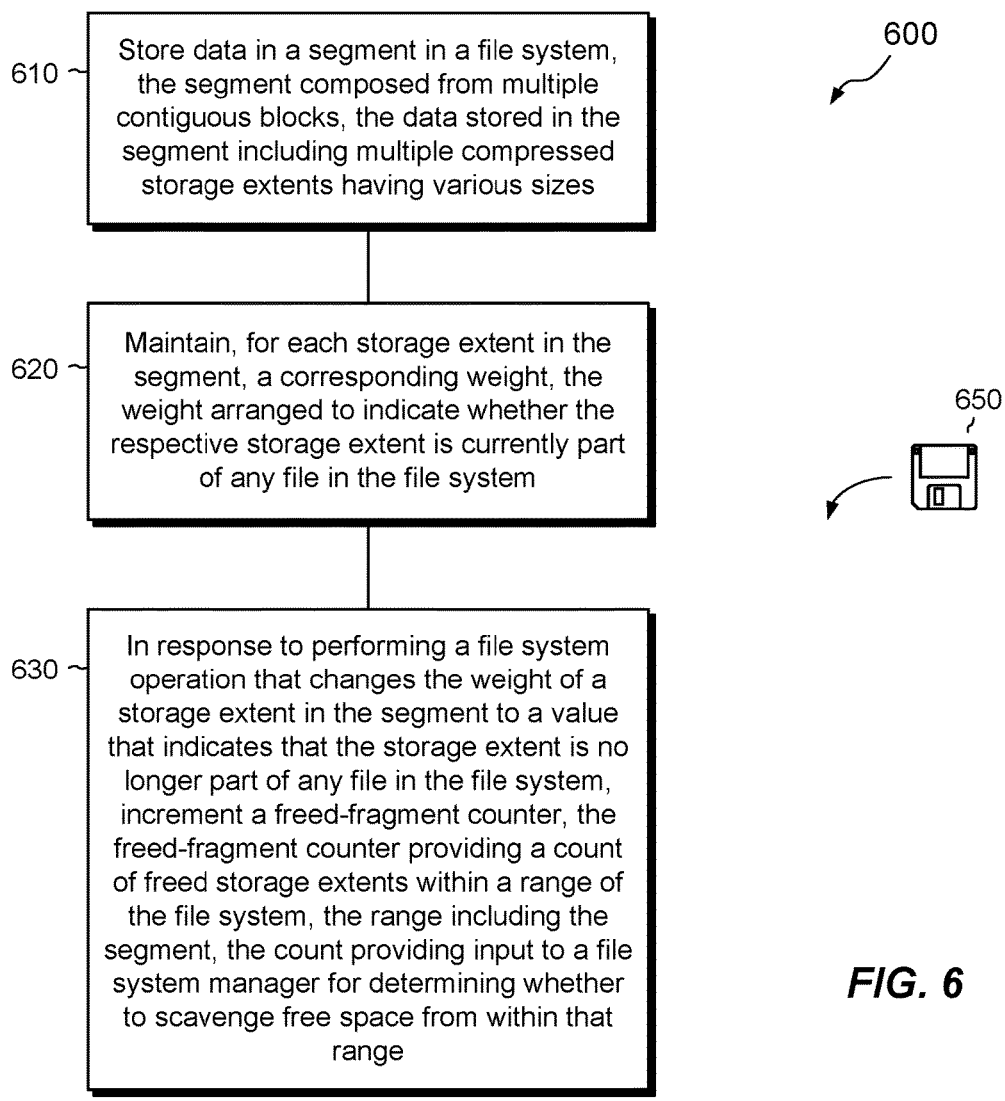
FIG. 6 is a flowchart showing an example method of managing storage space in a file system.

FIG. 6 shows an example process 600 for managing storage space in a file system. The process 600 may be carried out by the software constructs described in connection with FIGS. 1-3. Also, the various acts of the process 600 may be ordered in any suitable way. Accordingly, embodiments may be constructed in which acts are performed in orders different from those illustrated, which may include performing some acts simultaneously, even though the acts are shown as sequential in the illustrated embodiments.

At 610, data are stored in a segment 250 in a file system 150, the segment composed from multiple contiguous blocks 260, the data stored in the segment including multiple compressed storage extents 252 having various sizes.

At 620, for each storage extent 252 in the segment, a corresponding weight 244 is maintained, the weight 244 arranged to indicate whether the respective storage extent 252 is currently part of any file in the file system 150.

At 630, in response to performing a file system operation 270 that changes the weight of a storage extent 252 in the segment 250 to a value that indicates that the storage extent 252 is no longer part of any file in the file system 150, a freed-fragment counter FFC is incremented, the freed-fragment counter FFC providing a count of freed storage extents within a range 154 of the file system 150, the range 154 including the segment 150, the count providing input to a file system manager 150a for determining whether to scavenge free space from within that range 154.

An improved technique has been described for managing storage space in a file system 150. The technique applies reference weights 244 to compressed storage extents 252 stored in multi-block segments 250. Each time a reference weight for a compressed storage extent 250 in a segment 250 changes to a value, such as zero, which indicates that the storage extent is no longer in use, a file system manager 150a increments a freed-fragment counter FFC provided for a range 154 of the file system 150 that includes the segment 150. The file system manager 150a then determines whether to scavenge for free space in that range 154 of the file system 150 based at least in part on a count of the free-fragment counter FFC.

Having described certain embodiments, numerous alternative embodiments or variations can be made. For example, although particular metadata structures, such as segment VBMs and block pointers, have been shown and described, these are merely examples. Alternatively, other metadata structures may be employed for accomplishing similar results.

Also, although the segment VBM 250 as shown and described includes an extent list 242, this is merely an example. Alternatively, the extent list 242 or a similar list may be provided elsewhere, such as in the segment 250 itself (e.g., as a header).

Further, although the segment VBM 150 provides block virtualization, nothing prevents there from being additional or different block virtualization structures, or additional levels of block virtualization.

Also, while the freed-fragment counters have been described at certain levels of granularity, e.g., sets of blocks, CGs, slices, groups of slices, entire file system, etc., these are merely examples, as the freed-fragment counters may be provided at any level or levels of granularity.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing storage space in a file system, the method comprising:
    storing data in a segment in a file system, the segment composed from multiple contiguous blocks, the data stored in the segment including multiple compressed storage extents having various sizes;
    maintaining, for each storage extent in the segment, a corresponding weight, the weight arranged to indicate whether the respective storage extent is currently part of any file in the file system; and
    in response to performing a file system operation that changes the weight of a storage extent in the segment to a value that indicates that the storage extent is no longer part of any file in the file system, incrementing a freed-fragment counter, the freed-fragment counter providing a count of freed storage extents within a range of the file system, the range including the segment, the count providing input to a file system manager for determining whether to scavenge free space from within that range,
    wherein the method further comprises providing a segment VBM (virtual block map) that points to the segment, the segment VBM pointed to by multiple block pointers in the file system that map file locations to the storage extents in the segment, the segment VBM including an extent list that associates each storage extent in the segment with (i) a corresponding location of that storage extent within the segment and (ii) the corresponding weight, wherein the weight is further arranged to indicate whether any block pointers in the file system point to the segment VBM for accessing the respective storage extent, wherein the range of the file system is a first range provided within a physical address space of the file system, and wherein the segment VBM is stored in a second range of the physical address space of the file system.

2. The method of claim 1,
    wherein the segment is one of multiple segments within the range, each segment having an associated segment VBM that has an extent list that associates extents within that segment with corresponding locations and weights,
    wherein the range is one of multiple ranges within the file system, each range including multiple segments and having a respective freed-fragment counter, and
    wherein the method further comprises incrementing the freed-fragment counter of each of the multiple ranges in response to weights of storage extents in the respective range indicating that no block pointers any longer point to those storage extents.

3. The method of claim 2, wherein the method further comprises providing counts of the freed-fragment counters for the multiple ranges as inputs to the file system manager for use in selecting ranges of the file system from which to scavenge free space.

4. The method of claim 3, wherein the method further comprises:
    counting a number of allocated blocks in each of the multiple ranges to produce respective allocated-block counts; and
    providing the allocated-block counts as inputs to the file system manager for use in selecting ranges of the file system from which to scavenge free space.

5. The method of claim 4, wherein the method further comprises:
    selecting, by the file system manager, ranges from which to scavenge free space based upon (i) the counts of the freed-fragment counters for the multiple ranges and (ii) the allocated block counts for the multiple ranges; and
    performing free space scavenging of the selected ranges.

6. The method of claim 4, wherein the file system operation that changes the weight of a storage extent is a punch-hole operation to explicitly overwrite that storage extent with zeros.

7. The method of claim 4, wherein the file system operation that changes the weight of a storage extent is a write-split operation, the write-split operation copying the storage extent to a new segment and redirecting any block pointers in the file system that point to the segment VBM for accessing the storage extent to a new segment VBM for the new segment.

8. The method of claim 3, wherein the weight of a storage extent is further arranged to indicate a sum of weights of all block pointers in the file system that point to the segment VBM of the segment that stores that storage extent, and wherein the method further comprises subtracting a weight of a block pointer from the weight of that storage extent in response to the file system modifying that block pointer to no longer point to the segment VBM of the segment that stores that storage extent.

9. The method of claim 8, wherein the method further comprises storing an overall weight in each segment VBM, the overall weight based on a sum of all weights in the extent list stored in that segment VBM, and wherein the method further comprises updating the overall weight of that segment VBM in response to the file system updating a weight of a storage extent in the extent list of that segment VBM.

10. The method of claim 1, wherein the method further comprises:
storing an overall weight in the segment VBM, the overall weight based on a sum of all weights in the extent list stored in the segment VBM; and
updating the overall weight of the segment VBM in response to the file system updating a weight of a storage extent in the extent list of the segment VBM.

11. A data storage system, comprising control circuitry that includes a set of processing units coupled to memory, the control circuitry constructed and arranged to:
store data in a segment in a file system, the segment composed from multiple contiguous blocks, the data stored in the segment including multiple compressed storage extents having various sizes;
maintain, for each storage extent in the segment, a corresponding weight, the weight arranged to indicate whether the respective storage extent is currently part of any file in the file system; and
in response to performing a file system operation that changes the weight of a storage extent in the segment to a value that indicates that the storage extent is no longer part of any file in the file system, increment a freed-fragment counter, the freed-fragment counter providing a count of freed storage extents within a range of the file system, the range including the segment, the count providing input to a file system manager for determining whether to scavenge free space from within that range,
wherein the control circuitry is further constructed and arranged to provide a segment VBM (virtual block map) that points to the segment, the segment VBM pointed to by multiple block pointers in the file system that map file locations to the storage extents in the segment, the segment VBM including an extent list that associates each storage extent in the segment with (i) a corresponding location of that storage extent within the segment and (ii) the corresponding weight, wherein the weight is further arranged to indicate whether any block pointers in the file system point to the segment VBM for accessing the respective storage extent, wherein the range of the file system is a first range provided within a physical address space of the file system, and wherein the segment VBM is stored in a second range of the physical address space of the file system.

12. A computer program product including a set of non-transitory, computer-readable media having instructions which, when executed by control circuitry of a data storage system, cause the control circuitry to perform a method of managing storage space in a file system, the method comprising:
storing data in a segment in a file system, the segment composed from multiple contiguous blocks, the data stored in the segment including multiple compressed storage extents having various sizes;
maintaining, for each storage extent in the segment, a corresponding weight, the weight arranged to indicate whether the respective storage extent is currently cart of any file in the file system; and
in response to performing a file system operation that changes the weight of a storage extent in the segment to a value that indicates that the storage extent is no longer part of any file in the file system, incrementing a freed-fragment counter, the freed-fragment counter providing a count of freed storage extents within a range of the file system, the range including the segment, the count providing input to a file system manager for determining whether to scavenge free space from within that range,
wherein the method further comprises providing a segment VBM (virtual block map) that points to the segment, the segment VBM pointed to by multiple block pointers in the file system that map file locations to the storage extents in the segment, the segment VBM including an extent list that associates each storage extent in the segment with (i) a corresponding location of that storage extent within the segment and (ii) the corresponding weight, wherein the weight is further arranged to indicate whether any block pointers in the file system point to the segment VBM for accessing the respective storage extent, wherein the range of the file system is a first range provided within a physical address space of the file system, and wherein the segment VBM is stored in a second range of the physical address space of the file system.

13. The computer program product of claim 12,
wherein the segment is one of multiple segments within the range, each segment having an associated segment VBM that has an extent list that associates extents within that segment with corresponding locations and weights,
wherein the range is one of multiple ranges within the file system, each range including multiple segments and having a respective freed-fragment counter, and
wherein the method further comprises incrementing the freed-fragment counter of each of the multiple ranges in response to weights of storage extents in the respective range indicating that no block pointers any longer point to those storage extents.

14. The computer program product of claim 13, wherein the method further comprises providing counts of the freed-fragment counters for the multiple ranges as inputs to the file system manager for use in selecting ranges of the file system from which to scavenge free space.

15. The computer program product of claim 14, wherein the method further comprises:
counting a number of allocated blocks in each of the multiple ranges to produce respective allocated-block counts; and
providing the allocated-block counts as inputs to the file system manager for use in selecting ranges of the file system from which to scavenge free space.

16. The computer program product of claim 15, wherein the file system operation that changes the weight of a storage extent is a punch-hole operation to explicitly overwrite that storage extent with zeros.

17. The computer program product of claim 15, wherein the file system operation that changes the weight of a storage extent is a write-split operation, the write-split operation copying the storage extent to a new segment and redirecting any block pointers in the file system that point to the segment VBM for accessing the storage extent to a new segment VBM for the new segment.

18. The computer program product of claim 14, wherein the weight of a storage extent is further arranged to indicate a sum of weights of all block pointers in the file system that point to the segment VBM of the segment that stores that storage extent, and wherein the method further comprises subtracting a weight of a block pointer from the weight of that storage extent in response to the file system modifying that block pointer to no longer point to the segment VBM of the segment that stores that storage extent.

19. The computer program product of claim 18, wherein the method further comprises storing an overall weight in each segment VBM, the overall weight based on a sum of all weights in the extent list stored in that segment VBM, and wherein the method further comprises updating the overall weight of that segment VBM in response to the file system updating a weight of a storage extent in the extent list of that segment VBM.

\* \* \* \* \*